R. GAEBEL.
BONBON MACHINE.
APPLICATION FILED NOV. 1, 1910.
1,116,408.
Patented Nov. 10, 1914.
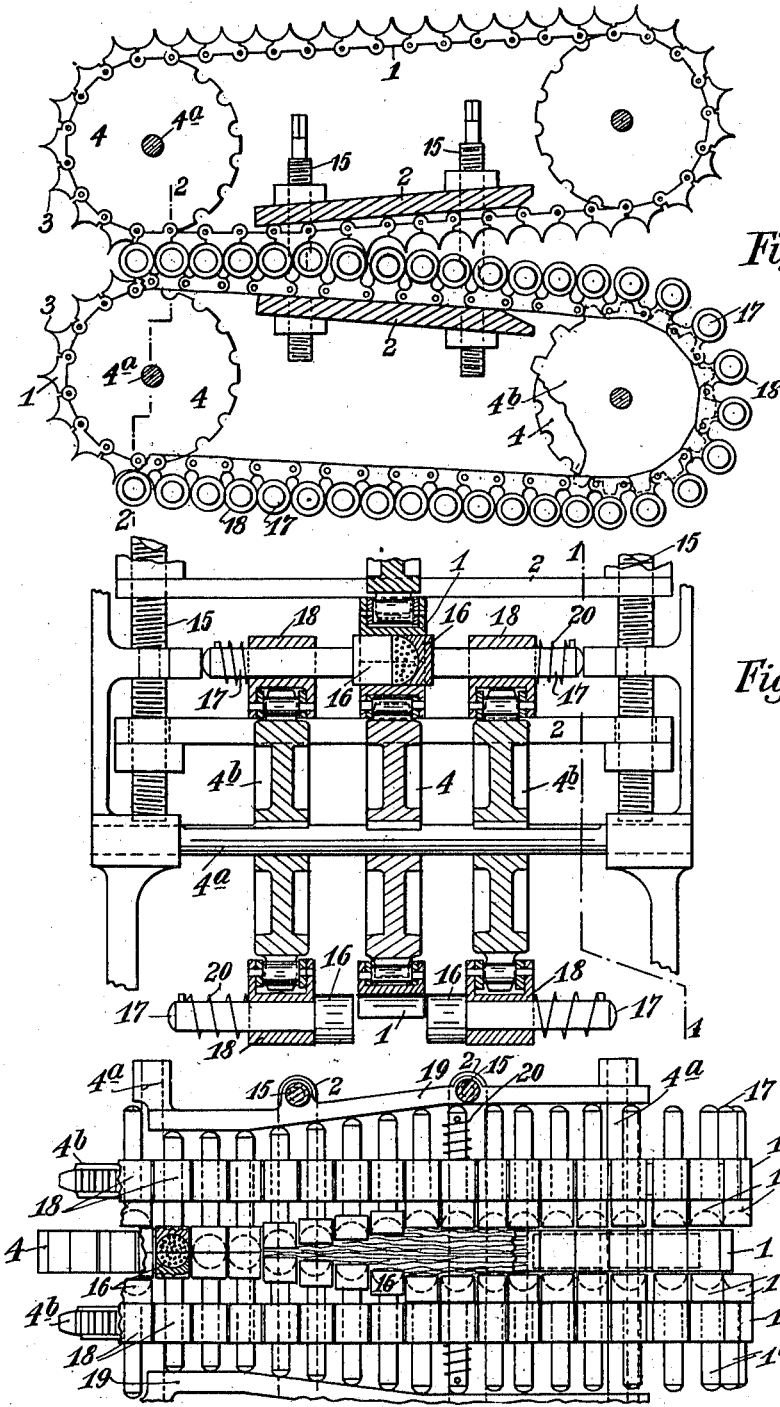
Fig: 1.
Fig: 2.
Fig: 3.
Witnesses:
Inventor.
Richard Gaebel,
By Jas. H. Griffin

UNITED STATES PATENT OFFICE.

RICHARD GAEBEL, OF DRESDEN, GERMANY.

BONBON-MACHINE.

1,116,408.  Specification of Letters Patent.  Patented Nov. 10, 1914.

Application filed November 1, 1910. Serial No. 590,123.

*To all whom it may concern:*

Be it known that I, RICHARD GAEBEL, a subject of the German Emperor, residing at Dresden-A., in Germany, have invented certain new and useful Improvements in Bonbon-Machines, of which the following is a specification.

This invention is a bonbon machine, and the object is to provide simple and efficient means for cutting and molding plastic material, more particularly sugar paste in order to form bonbons from such material, the sugar paste being fed in the form of rope.

An apparatus embodying the invention comprises a pair of coöperating endless carriers, such as chains, between which the rope-like plastic material is fed, the cutting and molding of such material being effected partly by means of the shape given to the links of these chains and partly by means of dies which are supported on other endless carriers. The dies are mounted on their carriers for sliding movement in a direction substantially at right angles to the path of movement of the carriers, and with the dies coöperate retracting means and mold impelling means said retracting means being preferably in the form of springs which operate to impart movement to the dies in directions away from each other, whereas the impelling means are positioned to force the corresponding dies of the two series toward each other and into coöperative relation at a certain point in the movement of the carriers. The dies are positioned in facing relation, and they are slidable on the carriers toward and from each other, said dies operating when moved inwardly and into registering relation to cut the plastic material and to mold said plastic material in the cavities which constitute the working faces of the aforesaid chain links.

Other features of the invention and the advantages thereof will appear from the following detailed description.

In the drawings: Figure 1 is a section on line 1—1 of Fig. 2. Fig. 2 is a section on line 2—2 of Fig. 1. Fig. 3 is a plan view illustrating the endless carriers for the dies and the two series of dies together with retracting means for the dies and impelling means operating to force the dies inwardly toward each other and upon the material which is fed between them.

Referring in the first place to Fig. 1, the apparatus therein shown comprises two endless chains 1, which travel on sprocket wheels 4 on shafts 4ª and over guide rails 2 which converge toward the right-hand pair of sprocket wheels. These chains carry short transverse outwardly directed knives 3, and the sprocket wheels are adjustable so that where the two chains most nearly approach each other the knives 3 of the two chains can be arranged to touch or practically touch each other, or can be spaced so that more or less clearance remains between their edges. The guide-rails 2 are collectively engaged by right and left-hand threads on a pair of screws 15, so that by rotating said screws the rails are uniformly moved toward or away from each other. A rope of sugar paste is fed between the two chains, as indicated in Fig. 3, and is gripped by the knives and finally cut into bonbons, which are either completely severed from each other or remain connected by ligaments of paste, according to the adjustment of the chains. The knives 3 are shaped so that their flanks form complementary parts of semi-cylindrical cavities, and where the knives of the two chains contact the cylinders are completed, with the result that the bonbons are molded into cylindrical shape. At opposite sides of the chains, at the part where the chains approach each other most closely, the reciprocatable dies 16 are thrust between the chains to complete the molding of the paste, or merely to mark the same.

Two endless carriers 18 are employed for supporting the two series of dies 16. The endless carriers are in the form of chains, the links of which are flexibly connected together in any suitable way, and these chains pass around suitable sprocket wheels 4ᵇ mounted on shafts 4ª. The sprocket chains engage with the sprocket wheels so as to be supported thereby, and movement is imparted to the sprocket chains by the rotation of the sprocket wheels. The sprocket chains 18 are spaced a suitable distance from each other and they are positioned in parallel relation.

The dies 16 are mounted on the endless carriers or chains 18 for movement toward and from each other, the dies of one series being in facing relation to the dies of the other series and the two series of dies being correspondingly positioned in order that the dies will register when forced toward each other. As shown, each die is a solid piece of metal having a semi-globular cavity which constitutes the working face thereof, but when the corresponding dies of one pair are forced inwardly toward each other so as to occupy the coöperative relation shown in plan in Fig. 3, the cavities of the dies are in register so as to produce a globular chamber which molds the material to the desired form. Obviously, the working faces of the dies may be given any desired contour.

The dies are slidably mounted on the carriers or chains by any suitable means so that the dies of one series will be movable toward and from the dies of the other series. As shown, each die is provided with a stem 17 which is fitted for sliding movement in one link of chain 18, each stem being of sufficient length to enable the dies to have a comparatively wide range of movement. Around each die stem is fitted a coiled spring, only two springs being shown at 20 in Fig. 3, although it will be understood that the stem of each die is provided with a spring which operates to impart sliding movement to the stem and the die for the purpose of withdrawing or retracting said die from an operative position with respect to the corresponding die of the other series.

For imparting movement to the dies so that they will approach each other at the proper time, suitable guide bars 19 are employed at the respective sides of chains 18. These guide bars are inclined for a part of their length and are parallel for the remainder of their length. Furthermore, the guide bars are positioned in the path of stems 17 so that the stems will be pressed by the springs normally into engagement with the guide bars. As the stems ride upon the inclined parts of the guide bars, the dies are forced inwardly toward each other, and as the stems ride upon the parallel parts of the guide then the dies are pressed toward each other to their final positions. It will be noted that the dies are gradually forced inward by the stems riding upon the inclined parts of the guide bars, and thus the dies will be gradually forced into the plastic material for the purpose of cutting said material from the rope, and when the dies are forced toward each other so as to contact one with the other, the plastic material is given the desired shape or molded within the cavities between the knives 3 of chains 1, 1.

The operation will be readily understood from the foregoing description. The plastic material is fed between the dies, and said dies are movable with the endless carriers. Springs 20 open the dies to their full extent, and as the dies approach guide bars 19 the stems 17 ride upon the inclined parts of the guide bars. As these inclined parts approach each other, the stems and dies of the two series are gradually forced together so that the dies will cut through the material. The stems are forced by the parallel parts of the guide bars inwardly to their final positions, as a result of which the dies are closed and brought into contact with each other. The dies and the material molded therein travel with the chains around the sprocket wheels, thus carrying the stems out of contact with the guide bars, whereupon the springs 20 act on the stems to open the dies for discharging the molded material.

From the foregoing description it is apparent that the material will be cut and molded rapidly and economically, it being preferred to impart traveling movement continuously to the endless carriers and the two series of dies thereon.

What I claim as my invention and desire to secure by Letters Patent of the United States is:—

In a bonbon machine, the combination of a pair of coacting endless traveling chains provided with transverse knives shaped to coöperate with each other and to constitute open ended chambers, two endless traveling carriers positioned one on either side of the plane of the operation of the traveling chains and adapted to move in synchronism therewith, a series of dies slidably mounted on each of the endless carriers, the dies of one series being positioned in facing relation to the dies of the other series, and spaced to enter the aforesaid open ended chambers formed between the transverse knives of the traveling chains, means operating to successively advance corresponding dies of the two series toward one another, and means for normally retracting said dies.

In witness whereof I have signed this specification in the presence of two witnesses.

RICHARD GAEBEL.

Witnesses:
 PAUL ARRAS,
 CLÄRE SIMON.